US010379751B2

United States Patent
Schuster et al.

(10) Patent No.: US 10,379,751 B2
(45) Date of Patent: Aug. 13, 2019

(54) MEMORY SWAPPER FOR VIRTUALIZED ENVIRONMENTS

(71) Applicant: Technion Research & Development Foundation Limited, Haifa (IL)

(72) Inventors: Assaf Schuster, Haifa (IL); Nadav Amit, Haifa (IL); Dan Tsafrir, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 0 days.

(21) Appl. No.: 15/723,192

(22) Filed: Oct. 3, 2017

(65) Prior Publication Data

US 2018/0046386 A1    Feb. 15, 2018

Related U.S. Application Data

(63) Continuation of application No. 15/119,777, filed as application No. PCT/IL2015/050172 on Feb. 16, 2015, now Pat. No. 9,811,268.

(Continued)

(51) Int. Cl.
*G06F 3/06* (2006.01)
*G06F 9/455* (2018.01)
*G06F 12/1009* (2016.01)

(52) U.S. Cl.
CPC .......... *G06F 3/0611* (2013.01); *G06F 3/0608* (2013.01); *G06F 3/0647* (2013.01);
(Continued)

(58) Field of Classification Search
CPC .... G06F 3/0647; G06F 3/0683; G06F 3/0611; G06F 3/0608; G06F 3/0665;
(Continued)

(56) References Cited

U.S. PATENT DOCUMENTS 7,849,228 B2   12/2010  Boyd et al.
2012/0072906 A1*  3/2012  Tsirkin ................ G06F 12/1009
718/1
(Continued)

FOREIGN PATENT DOCUMENTS

WO   WO 2012/069276   5/2012
WO   WO 2015/125135   8/2015

OTHER PUBLICATIONS

International Search Report and the Written Opinion dated Jun. 18, 2015 From the International Searching Authority Re. Application No. PCT/IL2015/050172.
(Continued)

*Primary Examiner* — Hua J Song (57) ABSTRACT

A method for reducing disk read rate by managing dataset mapping of virtual machine (VM) guest memory, comprising: monitoring a plurality of disk read write operations of a VM guest; updating a dataset mapping between disk blocks allocated to the VM guest and corresponding physical addresses of memory pages of the VM guest containing replica of data stored in the disk blocks, based on the plurality of disk read write operations; when identifying writing to one of the memory pages, removing a mapping of corresponding disk block and corresponding physical address of memory page; when reclaiming a mapped memory page of the VM guest by a host of the VM guest, discarding data contained in the memory page; and when the data is requested by the VM guest after it was reclaimed by said host, retrieving the data from corresponding disk block according to the mapping.

7 Claims, 2 Drawing Sheets

Related U.S. Application Data (60) Provisional application No. 61/941,507, filed on Feb. 19, 2014.

(52) U.S. Cl.
CPC .......... *G06F 3/0652* (2013.01); *G06F 3/0664* (2013.01); *G06F 3/0665* (2013.01); *G06F 3/0683* (2013.01); *G06F 9/45558* (2013.01); *G06F 12/1009* (2013.01); *G06F 2009/45583* (2013.01); *G06F 2009/45591* (2013.01); *G06F 2212/152* (2013.01)

(58) Field of Classification Search
CPC .. G06F 3/0664; G06F 9/45558; G06F 3/0652; G06F 12/1009
USPC .......................................................... 711/165
See application file for complete search history.

(56) References Cited

U.S. PATENT DOCUMENTS

| | | |
|---|---|---|
| 2012/0179874 A1 | 7/2012 | Chang et al. |
| 2012/0311381 A1* | 12/2012 | Porterfield .......... G06F 11/1004 714/6.22 |
| 2012/0324181 A1 | 12/2012 | Garthwaite et al. |
| 2013/0282994 A1 | 10/2013 | Wires et al. |
| 2014/0006734 A1 | 1/2014 | Li et al. |
| 2014/0282514 A1 | 9/2014 | Carson et al. |
| 2017/0060437 A1 | 3/2017 | Schuster et al. |

OTHER PUBLICATIONS

Official Action dated Mar. 22, 2017 From the US Patent and Trademark Office Re. U.S. Appl. No. 15/119,777. (18 pages).
Restriction Official Action dated Jan. 17, 2017 From the US Patent and Trademark Office Re. U.S. Appl. No. 15/119,777. (5 pages).
Campello et al. "Non-Blocking Writes to Files",13th USENIX Conference on File and Storage Technologies (FAST '15):151-165, Feb. 2015.
Chen et al. "Improving Host Swapping Using Adaptive Prefetching and Paging Notifier", Proceedings of the 19th ACM International Symposium on High Performance Distributed Computing, HPDC'10, p. 300-303, Jun. 21, 2010.
Hines et al. "Applications Know Best: Performance-Driven Memory Overcommit With Gingko", 2011 IEEE Third International Conference on Cloud Computing Technology and Science (CloudCom), p. 130-137, Nov. 29, 2011.
Zhang et al. "Shared Memory Optimization in Virtualized Cloud",IEEE 8th International Conference on Cloud Computing: 261-268, Jun. 27, 2015.

\* cited by examiner

MEMORY SWAPPER FOR VIRTUALIZED ENVIRONMENTS

RELATED APPLICATIONS

This application is a continuation of U.S. patent application Ser. No. 15/119,777 filed Aug. 18, 2016, which is a National Phase of PCT Patent Application No. PCT/IL2015/050172 having International Filing Date of Feb. 16, 2015, which claims the benefit of priority under 35 USC § 119(e) of U.S. Provisional Patent Application No. 61/941,507 filed on Feb. 19, 2014. The contents of the above applications are all incorporated by reference as if fully set forth herein in their entirety.

FIELD AND BACKGROUND OF THE INVENTION

The present invention, in some embodiments thereof, relates to virtual machine (VM) guest memory management and, more particularly, but not exclusively, to reduction of disk read rate in management of VM guest memory.

The main enabling technology for cloud computing is machine virtualization, which abstracts the rigid physical infrastructure and turns it into soft components that may be easily managed and used. Clouds and virtualization are driven by strong economical incentives, notably the ability to consolidate multiple VM guest servers on one physical host. The number of VM guests that can be consolidated and supported on one physical host is typically limited by the size of the host's physical 20 memory, motivating hosts to overcommit their memory to increase their capacity.

Overcommitment of memory requires memory management to guarantee proper operation of all VM guests consolidated on the host. This is usually done by coordinating temporary allocations of unused memory assigned to lightly loaded VM guests to be used by more heavily loaded VM guests.

Basic overcommitment memory management s done by uncooperative virtual machine monitor (VMM) swapping where the host VMM overcommits the memory by swapping out guest memory pages to disk without the VM guest's knowledge.

Another overcommitment memory management method is using a "balloon" driver installed in the guest VM. Balloons allocate pinned guest memory pages at the request of the host VMM, thereby ensuring the VM guest will not use them so that they could be utilized for some other purpose by the host VMM.

Balloons' performance is significantly better then uncooperative VMM swapping, however, it is not a complete solution. Hosts cannot rely on VM guest cooperation because, for example, clients may have disabled or opted not to install 35 the balloon or failed to install the balloon due to technical difficulties. Also, balloons could reach their upper bound, set by the VMM (and optionally adjusted by clients) to enhance stability and to accommodate various VM guest limitations, they might be unable to reclaim memory fast enough to accommodate the demand that the host must satisfy or they could be temporarily unavailable due to inner VM guest activity such as booting or running high priority processes that starve guest kernel services.

Therefore, in most host systems, overcommitment memory management is done by using balloons whenever possible, and otherwise resorting to uncooperative VMM swapping.

SUMMARY OF THE INVENTION

According to an aspect of some embodiments of the present invention there is provided a method for reducing disk read rate by managing dataset mapping of virtual machine (VM) guest memory, comprising: monitoring a plurality of disk read write operations of a VM guest; updating a dataset mapping between disk blocks allocated to the VM guest and corresponding physical addresses of memory pages of the VM guest containing replica of data stored in the disk blocks, based on the plurality of disk read write operations; when identifying writing to one of the memory pages removing a mapping of corresponding disk block and corresponding physical address of memory page; when reclaiming a mapped memory page of the VM guest by a host of the VM guest, discarding data contained in the memory page; and when the data is requested by the VM guest after it was reclaimed by said host, retrieving the data from corresponding disk block according to the mapping.

Optionally, the monitoring and updating is performed by virtual machine monitor (VMM).

Optionally, the retrieving includes performing page prefetch from the corresponding disk block.

Optionally, the reclaiming of a mapped memory page of the VM guest is prioritized over reclaiming of unmapped memory page of the VM guest.

Optionally, when the VM guest is migrating, the dataset is also transported.

More optionally, data stored in mapped memory pages of the VM guest is not transported.

Optionally, the method further comprises: when page-table dirty-bit is set and memory of the VM guest is not write-protected, removing a mapping of a disk block and corresponding physical address of memory page.

Optionally, the updating is performed after serving VM disk write and before informing the VM guest that the write is completed.

Optionally, the identifying includes writing to one of the disk blocks.

According to some embodiments of the present invention there is provided a computer readable medium comprising computer executable instructions adapted to perform the method.

According to an aspect of some embodiments of the present invention there is provided a system for reducing disk read rate by managing dataset mapping of VM guest memory, comprising: a dataset mapping between disk blocks allocated to the VM guest and corresponding physical addresses of memory pages of the VM guest containing replica of data stored in the disk blocks a mapping module for: monitoring a plurality of disk read write operations of a VM guest; updating the dataset mapping based on the plurality of disk read write operations; and removing a mapping of corresponding disk block and corresponding physical address of memory page when identifying writing to one of the memory pages; a VMM for: discarding data contained in a mapped memory page of the VM guest when reclaiming the memory page by a host of the VM guest; and retrieving the data from corresponding disk block according to the mapping when the data is requested by the VM guest.

According to an aspect of some embodiments of the present invention there is provided a method for reducing disk read rate by detecting memory reallocation instructions and redirecting them to buffer, comprising: detecting instructions for reallocating at least one guest physical memory page currently reclaimed by a host of the VM guest; preventing the instructions from executing the memory reallocation; emulating the instructions and writing result on a buffer; when a complete page is written on the buffer, reallocating the results to the reclaimed guest physical memory page; and when a partial page is written on the buffer, merging the results with data on the reclaimed guest physical memory page.

Optionally, the method further comprises monitoring a plurality of memory reallocation instructions of the VM guest.

More optionally, the monitoring is done by VMM.

Optionally, the merging is performed after a predetermined time period from last emulated write of the page.

Optionally, the merging is performed when predetermined number pages are being emulated.

Optionally, the method further comprises, after the emulating: maintaining references to the original memory location of the reclaimed guest physical memory page and to target memory location of the results; and when of the VM guest instructs read of unavailable data of the reclaimed guest physical memory page, suspending the read instruction until the merging is complete.

Optionally, the preventing and the emulating are performed selectively for privileged code executed by the VM guest.

According to an aspect of some embodiments of the present invention there is provided a system for reducing disk read rate by detecting memory reallocation instructions and redirecting them to buffer, comprising: a monitoring module for detecting instructions for reallocating at least one guest physical memory page currently reclaimed by a host of the VM guest; a buffer; a VMM for: preventing the instructions from executing the memory reallocation; emulating the instructions and writing result on the buffer; reallocating the results to the reclaimed guest physical memory page when a complete page is written on the buffer; and merging the results with data on the reclaimed guest physical memory page when a partial page is written on the buffer.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for stming instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to virtual machine (VM) guest memory management and, more particularly, but not exclusively, to reduction of disk read rate in management of VM guest memory. The present invention is an improved version of uncooperative virtual machine monitor (VMM) swapping used by the host of the VM guest.

Host VMM may be, for example, kernel-based virtual machine (KVM), VMware ESX/ESXi, Microsoft Hyper-V or any other software, firmware and/or hardware that creates and runs virtual machines.

VM guest may be, for example, an operating system such as Linux, Microsoft Windows or Mac OSX, and/or one or more virtual machine processes each designed to run a single program.

Several problems are identified for having a significant effect on the degraded performance of uncooperative VMM swapping.

Silent swap writes occur when the a host of a VM guest reclaims a guest physical memory page containing data that is file content cached by the VM guest operation system (OS) long after the content is used, in the hope that it will get re-used in the future. The data is then written to the host's swap area on disk although is already exists in the VM guest's file on disk.

Stale swap reads occur when a VM guest generates an explicit input/output (110) request to read some block from its virtual disk into a physical memory page that was previously reclaimed by the host. Data is then read from the host's swap area to the physical memory page, only to be overwritten shortly after by the physical 1/0 operation.

False swap reads occur when a VM guest performs memory management on physical memory page that was previously reclaimed by the host. Memory management may include activities such as zeroing memory pages before they are (re)allocated, copying memory pages on write (COW) and/or migrating memory pages from one memory location to another due to memory compaction. As in the case of stale swap reads, data is then read to the physical memory, only to be overwritten.

Decayed swap sequentiality occurs when a VM guest too aggressively prefetches or caches file content from its virtual disk to alleviate latencies, so the host swaps out some other guest memory pages with cached file content to the swap area, to accommodate the excessive memory demand. Whereas the prefetched content blocks are contiguous on the virtual disk, they become scattered and uncoupled in the swap area, and host swap prefetching therefore becomes ineffective.

False page anonymity occurs because named memory pages of a VM guest, backed by files on its virtual disk, such as the memory pages of loaded executables and of files mapped to memory, are misclassifies by the host (as are all memory pages) as anonymous memory pages, that are not backed by files. Therefore, guests are unable to enjoy the advantages of preferring to swap named memory pages that can be reclaimed faster without write-back to the VM guest swap.

Methods and systems according to some embodiments of the present invention are addressing these problems and thus improving the performance of uncooperative VMM swapping.

According to some embodiments of the present invention, there is provided a method for reducing disk read rate by managing dataset mapping of VM guest memory. The dataset mapping between disk blocks allocated to the VM guest and corresponding physical addresses of memory pages of the VM guest containing replica of data stored in the disk blocks. Disk read write operations of the VM guest are monitored, and the dataset mapping is updated based on the monitored disk read write operations. To maintain accuracy of the dataset, when writing to the mapped memory pages is identified, the mapping of the corresponding disk block and physical address in the dataset mapping is removed, as the disk block and physical address does not contain replica of the same data. When an unmapped memory page of the VM guest is reclaimed by the host, data contained in the memory page is swapped to disk, as in regular uncooperative VMM swapping. When a mapped memory page of the VM guest is reclaimed by the host, data contained in the memory page is discarded. When the data that has been contained in the memory page and discarded is requested by the VM guest, the data is retrieved from the corresponding disk block according to the dataset mapping. By tracking the correspondence between disk blocks and guest memory pages, this method addresses the problems of silent writes, stale writes, decayed sequentially, and false page anonymity, as it prevent disk writes when data is already backed in disk blocks.

According to some embodiments of the present invention, there is provided a method for reducing disk read rate by detecting memory reallocation instructions and redirecting them to buffer. Instructions for reallocating a guest physical memory pages that are currently reclaimed by the host of the VM guest are detected. The instructions are prevented from executing the memory reallocation, the instructions are emulated and the result is written on a buffer. When a complete memory page is written on the buffer, the result is reallocated to the reclaimed guest physical memory page, and when a partial memory page is written on the buffer, the result is merged with existing data on the reclaimed guest physical memory page. By temporarily buffering data written by guests to reclaimed memory pages, this method addresses the problem of false reads as it prevents reading data from disc that would only have been overwritten.

Optionally, the methods are both used, so all of the above problems are addressed.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
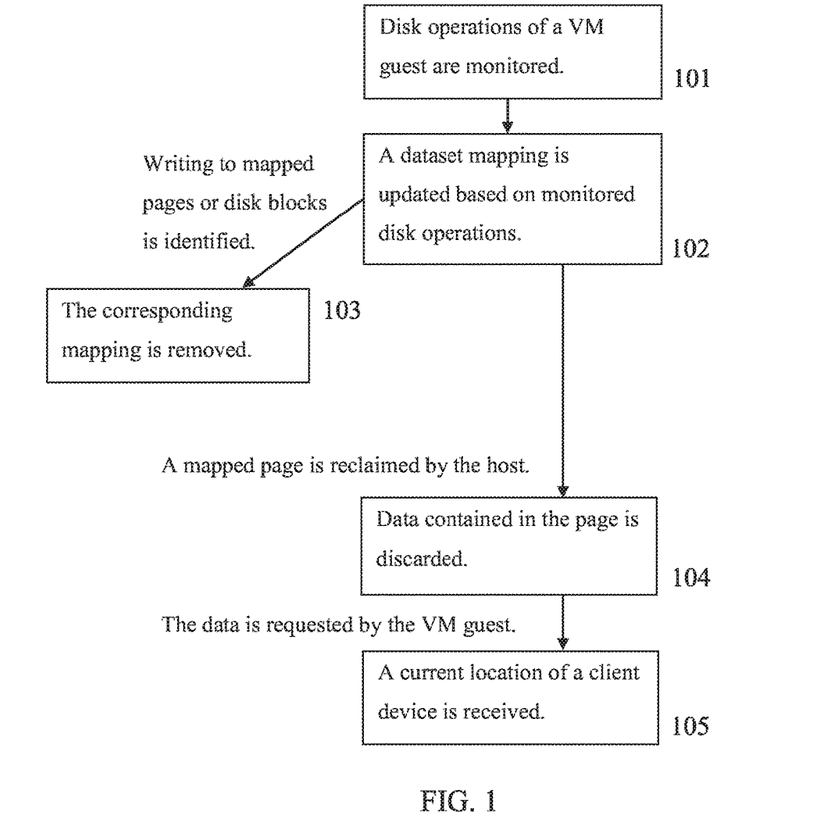
FIG. 1 is a flowchart schematically representing a method for reducing disk read rate by managing dataset mapping of VM guest memory, according to some embodiments of the present invention.
Figure 2:
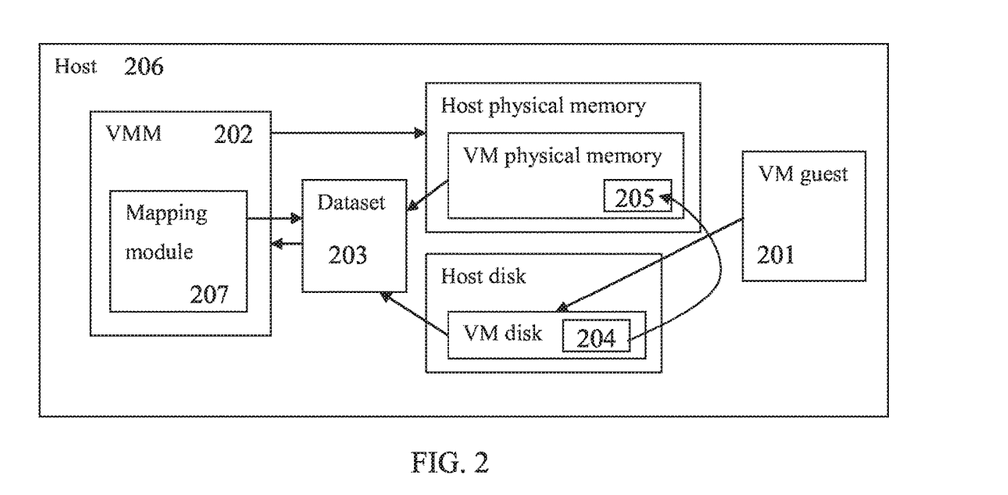
FIG. 2 is a schematic illustration of a system for reducing disk read rate by managing dataset mapping of VM guest memory, according to some embodiments of the present invention.

Referring now to the drawings, FIG. 1 is a flowchart schematically representing a method for reducing disk read rate by managing dataset mapping of VM guest memory, according to some embodiments of the present invention. Reference is also made to FIG. 2 which is a schematic illustration of a system for reducing disk reads rate by managing dataset mapping of VM guest memory, according to some embodiments of the present invention. The mapping gives the host the ability to treat relevant guest memory pages as file-backed and counteracts the harmful effect of large memory page caches within an unaware VM guest, because host may reasonably identify the memory pages that populate the cache and to efficiently discard them when the need arises, without undesirable consequences.

First, as shown at 101, disk read write operations of a VM guest 201 are monitored by mapping module 207. Optionally, mapping module 207 is part of a VMM 202. This leverages the fact that the host's VMM 202 manages all I/O request directed at the VM guest virtual disk, for example, when disk I/O is implemented via emulation or paravirtualization.

Then, as shown at 102, a dataset mapping 203 between disk blocks 204 allocated to VM guest 201 and corresponding physical addresses of memory pages 205 of VM guest 201 containing replica of data stored in disk blocks 204 is updated based on data replicated by the monitored disk read write operations. Optionally, the updating is performed by a VMM 202.

For example, in a KVM or quick emulator (QEMU) environment, this is done by a regular user-level QEMU process where each guest VM resides. The VM guest I/O requests are trapped by QEMU, which normally uses standard 'read' and 'write' system calls to satisfy the requests. These reads/writes are replaced with standard 'mmap' system calls, which provide the basic functionality of mapping guest memory pages to disk blocks, and memory pages thus become named and are treated by the host Linux kernel accordingly.

Optionally, the updating is performed after serving VM disk write and before informing VM guest 201 that said write is completed.

Then, as shown at 103, to maintain accuracy of the dataset, when writing to memory pages 205 is identified, the mapping of corresponding disk block 204 and corresponding physical address of memory page 205 in dataset mapping 203 is removed. Optionally, the mapping is also removed when writing to disk blocks 204 is identified. Optionally, when a disk read or write occurs, the mapping is first removed, and then re-established with updated information as new mapping. Optionally, the mapping is directly updated and not removed. This is done to prevent wrongful mappings as the disk block and physical address does not contain replica of the same data any longer.

For example, in a KVM or QEMU environment, this is done by modifying the host 'open' system call to support a new flag, used by QEMU when opening the guest virtual disk file. The flag instructs the kernel to invalidate memory page mappings when associated disk blocks are being written to through the corresponding file descriptor. The current implementation is modified so reads and writes are performed using a different system call that explicitly "invalidate" the associated disk blocks.

Optionally, when page-table dirty-bit is set and memory of VM guest 201 is not write-protected, the mapping of a disk block 204 and corresponding physical address of memory page 205 in dataset mapping 203 is removed. When the central processing unit (CPU) supports virtualization table dirty-bit, VMM 202 may avoid write-protecting VM guest 201. VM guest 201 then invalidates the mapping for pages with a dirty-bit set. The invalidation is done periodically or before the pages are reclaimed by VMM 202. Optionally, invalidation is performed by removing the mapping of disk block 204 and corresponding physical address of memory page 205 in dataset mapping 203. VMM 202 ensures that no two memory pages 205 refer to the same disk block 204 to avoid data corruption. Otherwise, VMM 202 would employ the above mentioned write-protection method.

Then, as shown at 104, when a mapped memory page 205 of VM guest 201 is reclaimed by a host 206 of VM guest 201, data contained in memory page 205 is discarded. Since memory pages 205 are named, they are evicted more frequently than anonymous memory pages, as their reclamation and retrieval is more efficient and no false page anonymity occurs. Specifically, when host 206 selects a mapped guest memory page for eviction, it knows the memory page is backed by a file on VM guest virtual disk, so it discards the memory page by discarding the mapping, instead of by writing to the host swap area, so no silent swap writes occur.

When an unmapped memory page of the VM guest is reclaimed by the host, data contained in the memory page is swapped to disk, as in regular uncooperative VMM swapping.

Then, as shown at 105, when the data that was contained in memory page 205 is requested by VM guest 201, the data is retrieved from corresponding disk block 204 according to dataset mapping 203.

Optionally, when VM guest 201 generates an I/O request to read some block from its virtual disk into a memory page 205 that was previously reclaimed by host 206 and mapped, dataset mapping 203 is updated instead of reading the reclaimed data from corresponding disk block 204, disregarding the specific target memory frame, so no stale swap reads occur.

Optionally, memory page prefetch from corresponding disk block 204 is performed, benefiting from the sequential structure of the original guest disk image, so no decayed swap sequentiality occurs.

Optionally, reclaiming of a mapped memory page 205 of VM guest 201 is prioritized over reclaiming of unmapped memory page of VM guest 201, as no writing to the disk swap area of host 206 is needed.

Optionally, when the disk image of VM guest 201 is created, VM guest 201 is informed that its virtual disk uses a specific logical sector size, corresponding to mapped memory logical sector size. This is done in order to comply with the inherent constraint of file-backed memory that mandates working in whole page granularity. For example, in a KVM or QEMU environment, the standard 'mmap' application programming interface (API) dictates that both the file offset and the mapped memory address should be 4 KB-aligned.

Optionally, when VM guest 201 is migrating, for example to a different host, dataset mapping 203 is also transported. Optionally, data stored in mapped memory pages 205 of VM guest 201 is not transported.

Figure 3:
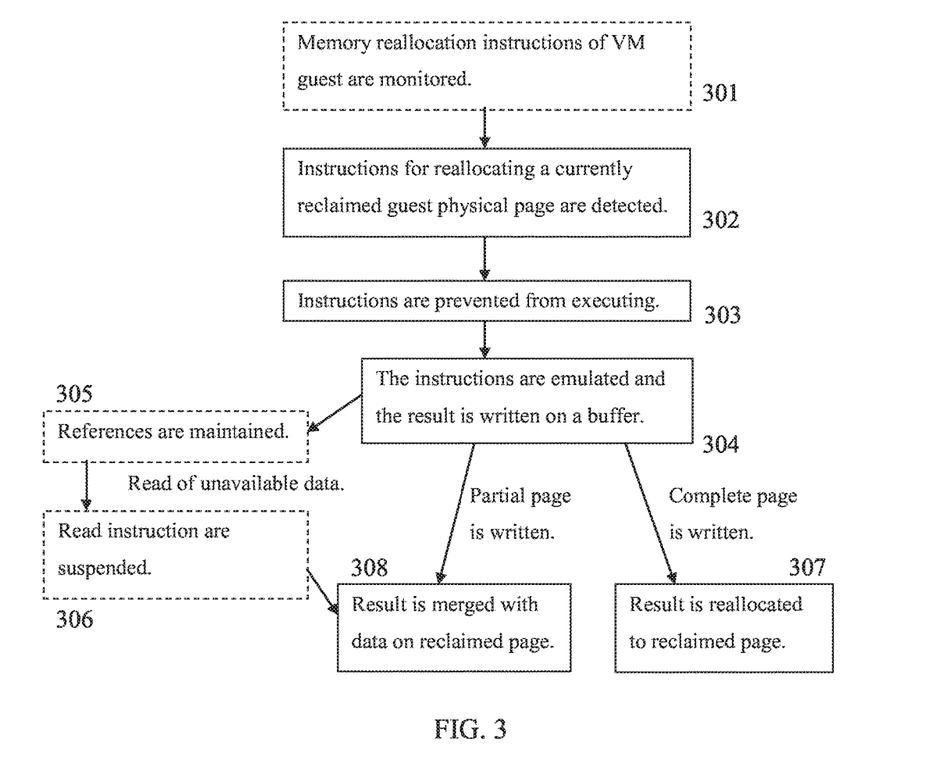
FIG. 3 is a flowchart schematically representing a method for reducing disk read rate by detecting memory reallocation instructions and redirecting them to buffer, according to some embodiments of the present invention.
Figure 4:
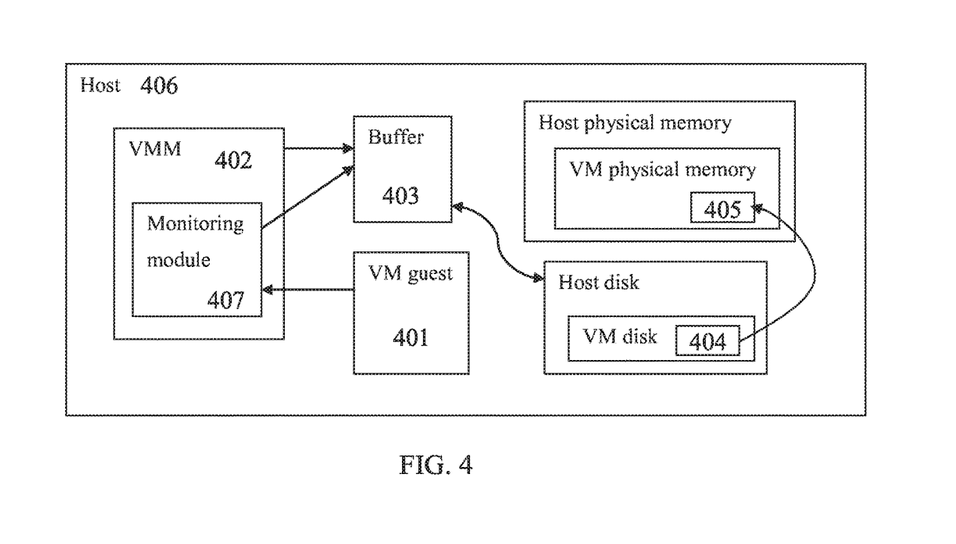
FIG. 4 is a schematic illustration of a system for reducing disk read rate by detecting memory reallocation instructions and redirecting them to buffer, according to some embodiments of the present invention.

Reference is now made to FIG. 3, which is a flowchart schematically representing a method for reducing disk read rate by detecting memory reallocation instructions and redirecting them to buffer, according to some embodiments of the present invention. Reference is also made to FIG. 4 which is a schematic illustration of a system for reducing disk read rate by detecting memory reallocation instructions and redirecting them to buffer, according to some embodiments of the present invention. These write instructions to reclaimed memory pages of the guest are emulated and not performed, and the resulting data is collected in buffers, to prevent false reads.

First, optionally, as shown at 301, memory reallocation instructions of VM guest 401 are monitored by monitoring module 407. Optionally, monitoring module 407 is part of VMM 402.

Then, as shown at 302, instructions for reallocating a guest physical memory page 405 currently reclaimed by a host 406 of VM guest 401 are detected by monitoring module 407. The data of guest physical memory page 405 currently exists on a disk block 404 which is the swap area of host 406.

Then, as shown at 303, the instructions are prevented from executing the memory reallocation. Therefore, guest physical memory is not accessed.

Then, as shown at 304, the instructions are emulated and the result is written on a buffer 403. Buffer 403 may be, for example, a disk block available for host 406. Optionally, buffer 403 is page-sized and page-aligned to comply with the constraint of whole page granularity.

Optionally, the emulation is done using binary translation techniques such as dynamic binary translation that employs translation caches and avoids frequent decoding. Clusters of instructions that access non present VM memory can optionally be executed using this mechanism without re-executing VM guest 401 using hardware assisted virtualization to avoid the overhead of entry and exit. VM guest 401 execution is resumed afterwards using hardware-assisted virtualization.

Optionally, the emulation is done in the VMM kernel. For example, in a KVM or QEMU environment, KVM emulation engine, which is originally intended for tracking update to the shadow page tables, may be used.

Optionally, as shown at 305, references are maintained to the original memory location of reclaimed guest physical memory page 405 on disk block 404 and to a target memory location of the results on disk block 404.

Optionally, as shown at 306, when VM guest 401 instructs read of unavailable data of reclaimed guest physical memory page 405, the read instruction are suspended until the merging of the result with data fetched from disk block 404 is complete.

Optionally, during emulation, recently written data that resides in buffer 403 is read directly from buffer 403, for example, when VM guest 401 instructs a read of said data.

Optionally, the preventing and the emulating are performed selectively for privileged code executed by VM guest 401.

Then, as shown at 307, when a complete page is written on buffer 403, the result is reallocated to reclaimed guest physical memory page 405 on the disk. In this case, VMM 402 concludes the memory page was reallocated and its previous content can be ignored, and discards the old data that reside on the swap area of host 406 or on the guest disk of VM guest 401. Optionally, the result is reallocated by remapping of another memory page from the pools of the host and populating it with data collected during the emulation process.

Alternatively, as shown at 308, when the emulation is terminated and a partial page is written on buffer 403, the result is merged with data on reclaimed guest physical memory page 405 fetched from disk block 404.

Optionally, the emulation is terminated when memory page 405 is not written sequentially from its start. Optionally, the emulation is terminated when after a predetermined time period from the last emulated write of the memory page, for example, ½, 1 and/or 2 milliseconds, and/or any intermediate, shorter or longer time period. Optionally, the emulation is terminated when predetermined number of memory pages are already being emulated, for example, 10, 30 and/or 100 pages and or any intermediate, smaller or larger number.

Optionally, emulation of a memory page is not initiated when predetermined number memory pages are already being emulated.

Optionally, the merge is performed right after memory page 405 is fetched and before it is unlocked and mapped in the page tables. This is done using the paging mechanism of host 406 to avoid any consistency issues that may arise due to the deferred memory writes. Such issues may occur in the host, for example, if its processes or modules read data from the guest memory right after they are written and before the merging is finished.

Each of the above methods may be implemented separately, according to some embodiments of the present invention. Optionally, both methods are implemented simultaneously.

Optionally, the methods are implemented to replace regular uncooperative VMM swapping. Performance is then similar or better than using a balloon. Optionally, the methods are implemented in addition to using a balloon, thus performance is good even when the balloon is unavailable.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems for VM guest memory management will be developed and the scope of the term VM guest memory management is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for reducing disk read rate by detecting memory reallocation instructions and redirecting them to buffer, comprising:

detecting instructions for reallocating at least one guest physical memory page currently reclaimed by a host of a virtual machine (VM) guest;
preventing said instructions from executing said memory reallocation;
emulating said instructions and writing result on a buffer;
maintaining references to an original memory location of said reclaimed guest physical memory page and to a target memory location of said results; and
when said VM guest instructs read of unavailable data of said reclaimed guest physical memory page, suspending said read instruction until said merging is complete;
when a complete page is written on said buffer, reallocating said results to said reclaimed guest physical memory page; and
when a partial page is written on said buffer, merging said results with data on said reclaimed guest physical memory page.

2. The method of claim 1, further comprising:
monitoring a plurality of memory reallocation instructions of said VM guest.

3. The method of claim 2, wherein said monitoring is done by virtual machine monitor (VMM).

4. The method of claim 1, wherein said merging is performed after a predetermined time period from last emulated write of said page.

5. The method of claim 1, wherein said merging is performed when predetermined number pages are being emulated.

6. The method of claim 1, wherein said preventing and said emulating are performed selectively for privileged code executed by said VM guest.

7. A system for reducing disk read rate by detecting memory reallocation instructions and redirecting them to buffer, comprising:
a buffer;
a program store storing code; and
at least one hardware processor coupled to the program store, for implementing the stored code, the code comprising:
code for detecting instructions for reallocating at least one guest physical memory page currently reclaimed by a host of a virtual machine (VM) guest;
a virtual machine monitor (VMM) for:
preventing said instructions from executing said memory reallocation;
emulating said instructions and writing result on said buffer;
maintaining references to an original memory location of said reclaimed guest physical memory page and to a target memory location of said results;
when said VM guest instructs read of unavailable data of said reclaimed guest physical memory page, suspending said read instruction until said merging is complete;
reallocating said results to said reclaimed guest physical memory page when a complete page is written on said buffer; and
merging said results with data on said reclaimed guest physical memory page when a partial page is written on said buffer.

* * * * *